United States Patent [19]

Krey

[11] 4,014,810

[45] Mar. 29, 1977

[54] DEPOLARIZER MASS FOR GALVANIC PRIMARY CELLS

[75] Inventor: Winfried Krey, Ellwangen-Neunheim, Germany

[73] Assignee: Varta Batterie Aktiengesellschaft, Hannover, Germany

[22] Filed: Mar. 9, 1976

[21] Appl. No.: 665,253

Related U.S. Application Data

[63] Continuation of Ser. No. 503,312, Sept. 5, 1974, abandoned.

[52] U.S. Cl. .............................. 252/182.1; 429/217
[51] Int. Cl.² ........................................ H01M 4/08
[58] Field of Search .......... 136/136, 137, 138, 163, 136/157; 429/212, 215; 252/182.1

[56] References Cited

UNITED STATES PATENTS

| | | | |
|---|---|---|---|
| 2,942,050 | 6/1960 | Denes | 136/3 |
| 3,306,781 | 2/1967 | Siller | 136/138 |
| 3,600,231 | 8/1971 | Bawson | 136/137 |

*Primary Examiner*—Donald L. Walton
*Attorney, Agent, or Firm*—Weiser, Stapler & Spivak

[57] ABSTRACT

A depolarizer mass for galvanic cells includes, in addition to the conventional ingredients, a hydrophobic agent. This agent is introduced by addition to the electrolyte, or by impregnation of the solid ingredients.

5 Claims, No Drawings

DEPOLARIZER MASS FOR GALVANIC PRIMARY CELLS

This is a continuation of application Ser. No. 503,312 now abandoned filed Sept. 5, 1974.

The invention relates to a depolarizer mass for galvanic cells, whose principal ingredients are manganese dioxide, graphite, and/or carbon black, and possibly zinc oxide, and an aqueous solution of ammonium chloride, and/or zinc chloride as electrolyte.

Depolarizer masses for primary cells based on the Leclanché or zinc chloride-system contain as their basic ingredients manganese dioxide, graphite, and/or carbon black, and possibly zinc oxide and as electrolyte an aqueous solution of ammonium chloride, and/or zinc chloride. A carbon rod serves as the electrical conductor in these cells, and zinc and magnesium serve as the anode; a separator body is arranged between anode and depolarizer. In such cells, the electrolyte content of the depolarizer amounts to more than 25% by weight. However, their shelf life is unsatisfactory, compared with cells with dry depolarizer masses. In particular, depolarizer masses with high water content (24 – 30% by weight) which are currently common, and in which the electrolyte usually contains a major amount of zinc chloride, give rise to elements having high incidence of malfunctioning and short shelf life. Measures for improving the shelf life of such cells by hermetic sealing (e.g. by use of paraffined carbon rods with bituminous grouting, or by sealing with elastomers) can prevent or decrease the drying out. However, changes still occur during storage, which reduce considerably the efficiency of the cell. For example, there can readily be detected the evolution of gas, particularly hydrogen at the anode, which can increase the cell pressure to such an extent that the zinc cup develops bulges which partially disrupt the contact between anode surface and electrolyte. Even without this, the presence of gas bubbles on the anode surface causes a reduction in active area. When a gas phase develops on the anode surface, the corrosion process at the anode-gas-electrolyte interface accelerates. This effect is especially harmful in cells, which are stored at elevated temperatures, e.g. 45° C (tropic storage). Attempts to decrease the hydrogen formation on the anode by means of suitable inhibitors, have led to no significant improvement.

It has been found that the shelf life of a cell becomes worse, the longer the depolarizer mass is mixed. This is particularly true for masses with high electrolyte content, which then feel especially moist. After storage, it could be observed that depolarizer bodies of such mass material were more moist at the bottom than at the top. Thus, during storage, gravity must have shifted the electrolyte, since the evaporation loss determined by weighing was minimal. In contrast, dry depolarizer masses exhibited after storage more uniform electrolyte distribution, no pronounced gas evolution, and therefore good electrode contact and a longer shelf life.

Accordingly, it is an object of the invention to manufacture the depolarizer mass, without substantial change in its principal ingredients including particularly the electrolyte content, but in such manner that it experiences no physical change during storage.

This object and others which will appear, are achieved by providing a depolarizer mass which contains, even before it is formed into a body, the entire quantity of electrolyte used in the primary cell, that electrolyte constituting at least 25% by weight of the mass, and at least part of the surface of the solid components being treated with a hydrophobic agent.

The hydrophobic treatment of cathode mixtures is known for gas-diffusion electrodes, e.g. air-oxygen cells or fuel cells. There the hydrophobic treatment prevents penetration of electrolyte into the porous electrode, and keeps open the pores for the gaseous depolarizer (gas-diffusion electrode). Hydrohobic binders, such as polystyrene or polyisobutylene are often used in the cathode bodies of alkaline cells. These binders are to prevent softening of the pressed cathode by alkaline electrolyte penetrating from the outside. In contrast, the present invention has the particular object of embedding between solid particles the greatest possible quantity of liquid, without causing the mixture to assume pasty consistency. A similar effect is known from so-called "dry" water, which is a fine dispersion of water droplets between particles of hydrophobic silicic acid with large surface (aerosil).

The depolarizer mass of the invention contains the entire neutral or weakly acidic electrolyte of the cell, manganese dioxide as solid depolarizer, a quantity of water or rather electrolyte which is greater than average, and a very small quantity of a liquid of grease-like hydrophobic agent. The electrolyte content of the depolarizer mass is between about 25 and 45% by weight; this corresponds to a water content of about 18 – 36% by weight. The electrolyte content is preferably 28 – 40% by weight. The content of hydrophobic agent is between about 0.02 – 0.5% by weight, relative to the dry materials.

Suitable hydrophobic agents are any liquids, oils, and greases which are resistant to manganese dioxide. Silicone oils and greases, produced from alkyl-chlorsilane mixtures (polyorgano-siloxane) have proved to be particularly appropriate. The hydrophobic treatment can be effected by impregnation of the solid raw materials (manganese dioxide or carbon black) with the hydrophobic agent. This agent may be dissolved in a solvent (e.g. benzene or acetone), in order to achieve more uniform distribution. Subsequently, the solvent is evaporated and the depolarizer mass formed from the impregnated materials.

Instead of a solution, an oil-in-water emulsion of the hydrophobic agent can also be used, and the water then at least partly evaporated. However, the hydrophobic effect can also be achieved more easily and cheaply by adding the aqueous emulsion of hydrophobic agent to the solid components of the depolarizer mass or to the electrolyte and stirring it in uniformly.

This eliminates prior impregnation which may require the additional expense of solvents, as well as the drying operation. It is however disadvantageous that oil-in-water emulsions of hydrophobic liquids or greases generally contain small quantities of emulsifiers for stabilization. Depending on the properties of these emulsifiers, the transfer of the hydrophobic agent from the electrolyte to the surface of the solid ingredients of the depolarizer can be largely inhibited. In that case, if the drying process is to be omitted, substantially more hydrophobic agent has to be used to obtain adequate results. The emulsifiers can even be such good wetting agents that the opposite effect is obtained. Therefore, care has to be taken during production of the emulsion that only the smallest possible amount of emulsifier is added. Suitable oil-in-water emulsions based on silicone oils are available, e.g. under the trade name "Baysilon-Ölemulsion T" (a medium viscosity emulsion of high molecular silicon oil) and "Persoftal 4242" (a 35% aqueous metal-salt-free emulsion of polydimethyl-siloxane), from Farbenfabriken Bayer, Leverkusen, Germany. Tests have shown that hardness sensitive emulsifiers can be used to best advantage, their action being neutralized by multivalent ions of the electrolyte, e.g. $Zn^{2+}$. In that case the electrolyte acts as demulsifier. When such emulsions are added to the electrolyte, the emulsion breaks down. However, the demulsifying process takes place so slowly that there is generally enough time for production of the depolarizer mass. The hydrophobic agent can still be stirred into the depolarizer mass and then deposits gradually on the surface of the solid components. The hydrophobic treatment is then especially effective and obtainable with least quantities of hydrophobic agent. If, however, the emulsion breaks down so rapidly that uniform distribution of the hydrophobic agent becomes impossible, then the depolarizer mass can first be mixed with a strongly diluted aqueous emulsion of the hydrophobic agent, and the electrolyte added subsequently as a concentrated solution. Demulsification then takes place only after uniform distribution of the hydrophobic agent in the depolarizer mass. Depending on the choice of emulsifier, it may be necessary to add a demulsifier, in order to obtain demulsification. Numerous demulsifiers are known. For example, organic compounds containing sulfonate groups are suitable.

Organic compounds containing carboxylate groups (e.g. polyacrylate and various soaps), which are unstable in zinc chloride-containing electrolytes, constitute suitable emulsifiers. The product "Collacral P" from BASF of Ludwigshafen, Germany, which is a polyacrylacid salt containing amide groups has proved to be very suitable.

In lieu of hydrophobic treatment of the entire depolarizer mass before insertion into the cell, it is also permissible to treat only individual ingredients, (e.g. manganese dioxide or carbon black), or a portion of the mass, and to then stir this portion into the depolarizer mass. This may lead to savings in production.

EXAMPLE 1

5250 g of electrolytic manganese dioxide are impregnated with a solution of 2.4 g silicon oil in 180 g benzene, which is subsequently evaporated. The impregnated manganese dioxide is added to 750 g of acetylene black, 150 g of zinc oxide, and an electrolyte of 1050 g of zinc chloride and 2800 g of water. All ingredients are mixed into a homogeneous mass.

EXAMPLE 2

A quantity of 270 g of a 35% silicon oil-emulsion (available under the same Baysilon-Ölemulsion T) is mixed with 39.6 kg of electrolyte solution, consisting of 13.5 g of zinc chloride, 1.1 kg of ammonium chloride, and 25.0 kg of water. The mixture is immediately processed into a homogeneous depolarizer mass, together with 46.9 kg of manganese dioxide, 2.8 kg of graphite, 9.6 kg of acetylene-black, and 1.1 kg of zinc oxide. From this depolarizer mass, there are produced in known manner paperlined Monocells of designation IEC R 20. Table 1 shows the open-circuit voltage, short-circuit current, and discharge time for normal discharge as a function of storage time of cells embodying the invention, as compared with otherwise identical commercial cells, produced without the addition of silicon oil emulsion. The regime involved discharge for four minutes per hour, eight hours per day through 4 ohms to 0.9 volt. The values given are average values and their standard deviations.

EXAMPLE 3

0.18 g of Collacral P (an aqueous solution, containing about 16% of a polyacrylic acid salt, including amide groups) are dissolved in 175 g of water and mixed with 95 g of silicon oil (polydimethyl-siloxane of a viscosity of 1000 centipoise at 20° C); the mixture is emulsified by a fast turning blender. The emulsion is then diluted with 15 kg of water and mixed with 46.9 kg of manganese dioxide, 2.8 kg of graphite, 9.6 kg of acetylene-black, 1.1 kg of zinc-oxide, and 1.1 kg of ammonium chloride until homogenous distribution is achieved. An electrolyte solution of 13.5 kg of zinc chloride and 10 kg of water is then added and briefly stirred again.

The finished mixtures of all these examples are considerably dryer to the touch than otherwise identical depolarizer masses which have not been treated with hydrophobic agents.

Tests have shown that depolarizer masses for galvanic primary cells with neutral or weakly acidic electrolyte suffer no perceptible loss of electrochemical activity, whether they were produced from impregnated raw materials or directly with emulsions of hydrophobic agents, not even in those cases in which the hydrophobic agents are surface-active liquids such as silicon-oils, for example.

A still more unexpected result is that the surface of the zinc anode also suffers no loss of activity when depolarizer masses treated with hydrophobic emulsions are used. Moreover, neither the short-circuit current, nor the capacity is reduced, despite the apparently dryer consistency of the depolarizer mass, which evidently results from partial isolation of electrolyte droplets. The depolarizer masses embodying the invention behave as though the entire electrolyte contained in these masses were usable. It may be that, in embodiments of the present invention, the variations in volume and chemical composition which are known to take place in both the liquid and solid phases, always cause activation of a sufficiently large surface, or volume.

Table I

| Storage Time at 45° C months | Cell embodying the invention | | | Comparison Cell | | |
|---|---|---|---|---|---|---|
| | Open-circuit Voltage (Volts) | Short-circuit Current (amperes) | Discharge time 4 min/h, 8 h/day through 4 ohms (minutes) | Open-circuit Voltage (Volts) | Short-circuit Current (amperes) | Discharge time 4 min/h, 8h/day through 4 ohms (minutes) |
| 0 | 1.658±0.001 | 10.38±0.03 | 989± 6 | 1.662±0.001 | 10.08±0.02 | 909 ±36 |
| 1 | 1.636±0.001 | 8.92±0.03 | 933 ±12 | 1.639±0.001 | 8.41±0.03 | 874 ±99 |
| 2 | 1.627±0.001 | 8.27±0.03 | 963±4 | 1.629±0.001 | 7.23±0.04 | 691 ±66 |
| 3 | 1.619±0.002 | 7.50±0.08 | 901 ±6 | 1.624±0.001 | 6.30±0.07 | 418 ±15 |

I claim:

1. A method of making a depolarizer mass for a primary cell having solid ingredients and containing substantially the entire electrolyte used in the cell, said method comprising the steps of:

mixing with the electrolyte a hydrophobic agent in the form of an oil-in-water emulsion, the emulsion containing a small quantity of emulsifier, and the electrolyte having an ingredient which acts as demulsifier and causes the breakdown of the emulsion in the mixture;

mixing into a homogeneous depolarizer mass the solid ingredients and the mixture of electrolyte and hydrophobic agent emulsion before the emulsion in the electrolyte-agent mixture has had time to break down, in such proportions that the electrolyte content of the mass is at least about 25% by weight, the emulsion breaking down in the mass and the hydrophobic agent depositing gradually on the solid ingredients; and said hydrophobic agent being mixed into the electrolyte-agent mixture in the proportions of about 0.02% to 0.5% by weight relative to the solid ingredients.

2. The method of claim 1 wherein the electrolyte is a solution of zinc chloride, ammonium chloride and water, in the proportions of about 13.5 to 1.1 to 25.0 kilograms;

the hydrophobic agent is a 35% silicon-oil emulsion in the proportions of about 270 grams of the emulsion to 39.6 kilograms of the electrolyte solution, and the solid ingredients are manganese dioxide, graphite, acteylene-black and zinc oxide in the proportions of about 46.9 to 2.8 to 9.6 to 1.1 kilograms, and in the proportions of about 60.4 kilograms of solid ingredients to the 270 grams of the emulsion.

3. The method of claim 1 wherein the mixing of the solid ingredients with the electrolyte-agent mixture takes place substantially immediately following the mixing of the electrolyte with the agent.

4. The depolarizer mass produced by the method of claim 1.

5. The method of claim 1 wherein the emulsifier is a hardness sensitive emulsifier and the demulsifier ingredient of the electrolyte is multivalent ions.

* * * * *

UNITED STATES PATENT OFFICE
CERTIFICATE OF CORRECTION

Patent No. 4,014,810  Dated March 29, 1977

Inventor(s) Winfried Krey

It is certified that error appears in the above-identified patent and that said Letters Patent are hereby corrected as shown below:

On the cover sheet insert Item (30) Foreign Application Priority Data:

-- Germany       2352223       October 19, 1973 --.

Signed and Sealed this twenty-sixth Day of July 1977

[SEAL]

Attest:

RUTH C. MASON
*Attesting Officer*

C. MARSHALL DANN
*Commissioner of Patents and Trademarks*